(12) United States Patent
Jaker et al.

(10) Patent No.: US 11,654,614 B2
(45) Date of Patent: May 23, 2023

(54) METHOD OF PRINTING SEMI-CRYSTALLINE MATERIALS UTILIZING EXTRUSION BASED ADDITIVE MANUFACTURING SYSTEM

(71) Applicant: Stratasys, Inc., Eden Prairie, MN (US)

(72) Inventors: Vittorio L. Jaker, Chanhassen, MN (US); Paul Leavitt, Minneapolis, MN (US); Benjamin N. Dunn, St. Louis Park, MN (US)

(73) Assignee: Stratasys, Inc., Eden Prairie, MN (US)

( * ) Notice: Subject to any disclaimer, the term of this patent is extended or adjusted under 35 U.S.C. 154(b) by 144 days.

(21) Appl. No.: 16/042,568

(22) Filed: Jul. 23, 2018

(65) Prior Publication Data

US 2020/0023574 A1 Jan. 23, 2020

(51) Int. Cl.
| | |
|---|---|
| *B29C 64/118* | (2017.01) |
| *B29C 64/245* | (2017.01) |
| *B29C 64/393* | (2017.01) |
| B33Y 70/00 | (2020.01) |
| B29K 71/00 | (2006.01) |

(Continued)

(52) U.S. Cl.
CPC ......... *B29C 64/118* (2017.08); *B29C 64/245* (2017.08); *B29C 64/393* (2017.08); *B29K 2071/00* (2013.01); *B29K 2995/004* (2013.01); *B33Y 10/00* (2014.12); *B33Y 50/02* (2014.12); *B33Y 70/00* (2014.12)

(58) Field of Classification Search
CPC ......... B33Y 10/00; B33Y 50/02; B33Y 70/00; B33Y 30/00; B29C 64/118; B29C 64/245; B29C 64/393; B29C 64/20; B29C 67/00; B29C 31/08; B29C 64/209; B29K 2071/00; B29K 2995/004
See application file for complete search history.

(56) References Cited

U.S. PATENT DOCUMENTS

| | | | |
|---|---|---|---|
| 5,503,785 | A | 4/1996 | Crump et al. |
| 6,004,124 | A | 12/1999 | Swanson et al. |

(Continued)

*Primary Examiner* — Galen H Hauth
*Assistant Examiner* — Shibin Liang
(74) *Attorney, Agent, or Firm* — Peter J. Ims; Westman, Champlin & Koehler, P.A.

(57) ABSTRACT

A method of 3D printing a part with an extrusion-based additive manufacturing system includes providing a filament having a semi-crystalline material as a majority component of a polymeric matrix to a liquefier having a liquefier tube having an overall length between an inlet end and an outlet end. An upper portion of the liquefier tube adjacent the inlet end has a first length and a first cross-sectional area substantially perpendicular to a longitudinal axis and a lower portion of the liquefier tube adjacent the outlet end has a second length and a second cross-sectional area substantially perpendicular to the longitudinal axis, wherein the first cross-sectional area is greater than the second cross-sectional area. The method includes driving the filament into a melt zone located within the upper portion of the liquefier tube at a selected rate based upon a desired extrusion rate. The filament is melted within the melt zone forming a melt pool in the liquefier tube to provide the selected extrusion rate. The part is printed in a series of layers by extruding the melted filament having a majority of semi-crystalline material along tool paths representative of the part.

24 Claims, 5 Drawing Sheets

(51) Int. Cl.
 *B33Y 10/00* (2015.01)
 *B33Y 50/02* (2015.01)

(56) References Cited

U.S. PATENT DOCUMENTS

| | | | |
|---|---|---|---|
| 6,054,077 A | 4/2000 | Comb et al. | |
| 6,547,995 B1 | 4/2003 | Comb | |
| 6,814,907 B1 | 11/2004 | Comb et al. | |
| 7,384,255 B2 | 6/2008 | LaBossiere et al. | |
| 7,604,470 B2 | 10/2009 | LaBossiere et al. | |
| 7,625,200 B2 | 12/2009 | Leavitt | |
| 8,153,182 B2 | 4/2012 | Comb et al. | |
| 8,419,996 B2 | 4/2013 | Swanson et al. | |
| 8,647,102 B2 | 2/2014 | Swanson et al. | |
| 8,815,141 B2 | 8/2014 | Swanson et al. | |
| 8,926,882 B2 | 1/2015 | Batchelder et al. | |
| 9,527,242 B2 | 12/2016 | Rodgers et al. | |
| 9,707,721 B2 | 7/2017 | Susnjara | |
| 9,925,714 B2 | 3/2018 | Rodgers et al. | |
| 10,023,739 B2 | 7/2018 | Rodgers et al. | |
| 10,144,828 B2 * | 12/2018 | Rodgers | B29C 64/118 |
| 10,611,082 B2 * | 4/2020 | Mark | B33Y 70/00 |
| 2016/0375636 A1 | 12/2016 | Rodgers et al. | |
| 2017/0183497 A9 | 6/2017 | Rodgers et al. | |
| 2017/0232674 A1 * | 8/2017 | Mark | B29C 64/165 |
| | | | 264/308 |
| 2017/0291364 A1 | 10/2017 | Womer | |
| 2018/0043627 A1 | 2/2018 | Barclay et al. | |
| 2018/0044523 A1 | 2/2018 | Rodgers et al. | |

\* cited by examiner

METHOD OF PRINTING SEMI-CRYSTALLINE MATERIALS UTILIZING EXTRUSION BASED ADDITIVE MANUFACTURING SYSTEM

BACKGROUND

The present disclosure relates generally to methods of utilizing an extrusion based additive manufacturing system to build three-dimensional (3D) parts. More particularly, the present disclosure relates to methods of printing 3D parts with a semi-crystalline material with an extrusion based additive manufacturing system. All references disclosed herein are incorporated by reference.

Additive manufacturing, also called 3D printing, is generally a process in which a three-dimensional (3D) object is built by adding material to form a 3D part rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing work flow includes slicing a three-dimensional computer model into thin cross sections defining a series of layers, translating the result into two-dimensional position data, and feeding the data to a 3D printer which manufactures a three-dimensional structure in an additive build style. Additive manufacturing entails many different approaches to the method of fabrication, including fused deposition modeling, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D object may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is melted. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication, and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to slice a part to be built into multiple layers each printed in the same build plane, the geometry of the part may be used to determine the orientation of printing.

SUMMARY

One aspect of the present disclosure relates to a method of 3D printing a part with an extrusion based additive manufacturing system. The method includes providing a filament having a semi-crystalline material as a majority component of a polymeric matrix into a liquefier. The liquefier includes a liquefier tube having a cooled inlet end and a heated outlet end and an extrusion tip at the outlet end. The liquefier tube has an overall length between the inlet end and the outlet end, wherein an upper portion of the liquefier tube adjacent the inlet end has a first length and a first cross-sectional area substantially perpendicular to a longitudinal axis, and a lower portion of the liquefier tube adjacent the outlet end has a second length and a second cross-sectional area substantially perpendicular to the longitudinal axis. The first cross-sectional area is greater than the second cross-sectional area such that a first nominal distance from the outer surface of the filament to a first surface of the upper portion measured substantially perpendicular to the longitudinal axis is about 1.5 to about 2.5 times greater than a second nominal distance from the outer surface of the filament to a second surface of the lower portion measured substantially perpendicular to the longitudinal axis. The liquefier tube has a shoulder that transitions the first cross-sectional area and the second cross-sectional area is located in a melt zone of the liquefier. The method includes advancing the filament into the melt zone the liquefier at a selected rate based upon a desired extrusion rate and melting the filament within the melt zone to form a melt pool capped by a meniscus. The method further includes printing the part in a series of layers by extruding the melted filament having a majority of semi-crystalline material from the melt pool through the extrusion tip along tool paths representative of the 3D part.

Another aspect of the present disclosure relates to a method of reducing shear forces when 3D printing a part with an extrusion based additive manufacturing system. The method includes providing a filament to a liquefier tube, wherein the filament has an outer surface and wherein the filament comprises a polymeric matrix having a semi-crystalline material as a majority component. The method includes advancing the filament into a melt zone within a liquefier tube having an overall length between an inlet end and an outlet end, wherein an upper portion of the liquefier tube has a first length and a first cross-sectional area substantially perpendicular to a longitudinal axis and a lower portion of the liquefier tube has a second length and a second cross-sectional area substantially perpendicular to the longitudinal axis. The first cross-sectional area is greater than the second cross-sectional area such that a first nominal distance from the outer surface of the filament to a first surface of the upper portion measured substantially perpendicular to the longitudinal axis is about 1.5 to about 2.5 times greater than a second nominal distance from the outer surface of the filament to a second surface of the lower portion measured substantially perpendicular to the longitudinal axis. The liquefier tube includes a shoulder that transitions the first cross-sectional area and the second cross-sectional area where the shoulder is located in a melt zone of the liquefier. The method includes melting the filament within the melt zone of the liquefier tube to form a melt pool capped by a meniscus and continuing to advance the filament into the melt zone the liquefier at a selected rate based upon a desired extrusion rate to provide a selected flow rate such that at lower feed rates. A larger surface area in the upper portion relative to the lower portion increases recirculation at the meniscus and within a transition zone and reduces shear forces between the outer surface of the filament and inner surfaces of the liquefier tube. The method includes printing the part in a series of layers by extruding the feedstock having a majority of semi-crystalline material based along tool paths representative of the part.

The present summary is provided only by way of example, and not limitation. Other aspects of the present invention will be appreciated in view of the entirety of the present disclosure, including the entire text, claims and accompanying figures.

Definitions

Unless otherwise specified, the following terms as used herein have the meanings provided below:

The terms "about" and "substantially" are used herein with respect to measurable values and ranges due to expected variations known to those skilled in the art (e.g., limitations and variabilities in measurements).

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "printing onto", such as for "printing a 3D part onto a print foundation" includes direct and indirect printings onto the print foundation. A "direct printing" involves depositing a flowable material directly onto the print foundation to form a layer that adheres to the print foundation. In comparison, an "indirect printing" involves depositing a flowable material onto intermediate layers that are directly printed onto the receiving surface. As such, printing a 3D part onto a print foundation may include (i) a situation in which the 3D part is directly printed onto to the print foundation, (ii) a situation in which the 3D part is directly printed onto intermediate layer(s) (e.g., of a support structure), where the intermediate layer(s) are directly printed onto the print foundation, and (iii) a combination of situations (i) and (ii).

The term "providing", such as for "providing a chamber" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The term "meniscus" is used herein to define the upper surface of the melt pool of the semi-crystalline material within the liquefier tube. The meniscus can have a convex configuration, a concave configuration or a substantially flat configuration depending upon the rate of extrusion from the liquefier tube.

The term "transition zone" is the region in the liquefier tube beginning at the meniscus where solid filament enters the melt pool. The transition zone ends in the area where the filament is completely molten within the molten pool. In the transition zone, the filament is partially melted, due to exposure to radial heating and melting of resin, and has a leading, solid tip, the location of which is dependent on flow rate and heating temperature.

The term "mics" is used herein to define an extrusion flow rate of material from a nozzle by micro-cubic inches of material per second.

Figure 1:
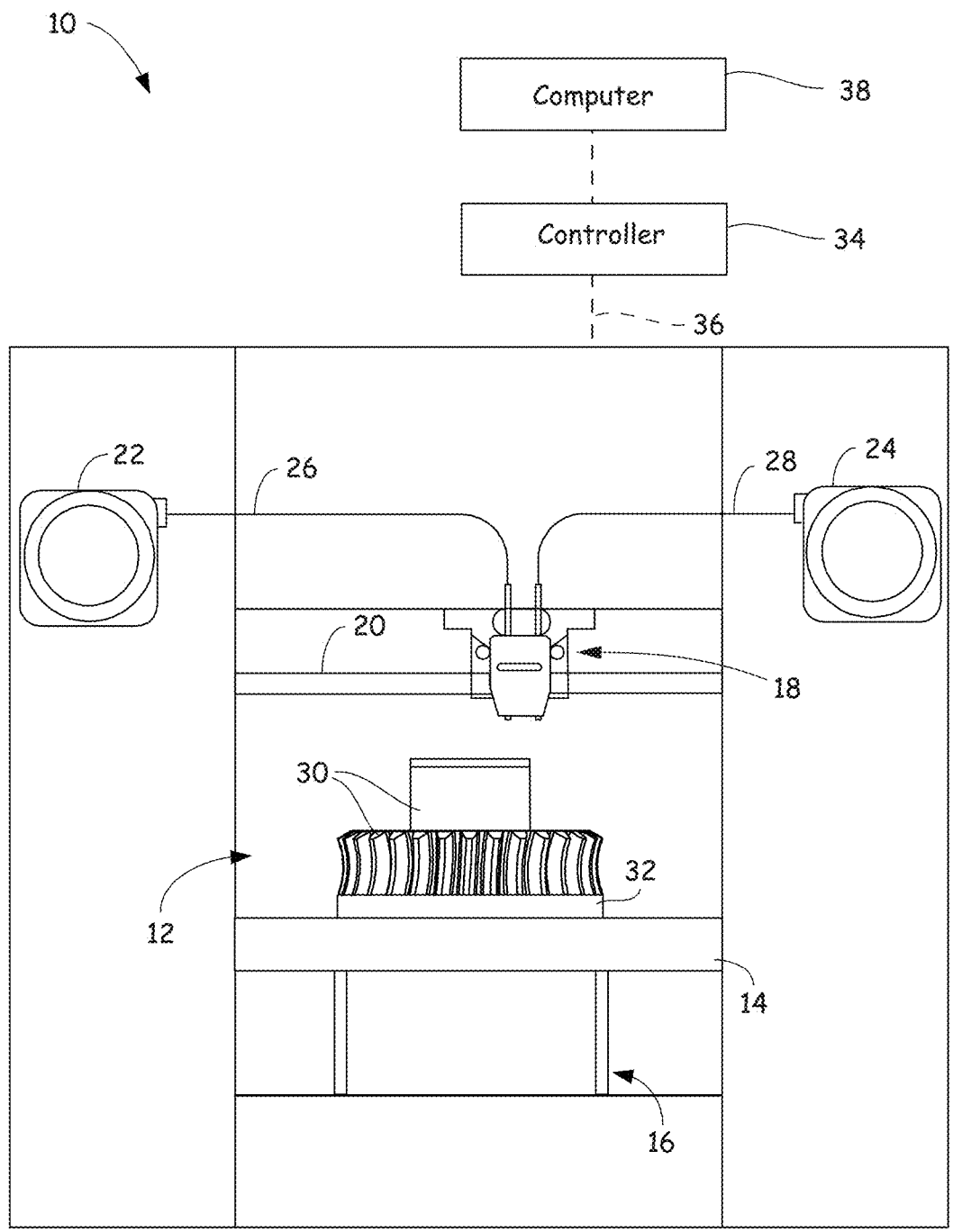
FIG. 1 is a schematic front view of an exemplary layer-wise extrusion based additive manufacturing system.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Extrusion based additive manufacturing technologies are operable to print, build, or otherwise produce 3D parts and/or support structures in a layer-by-layer manner or using three-dimension paths, at least in part using an additive manufacturing technique or system. Such additive manufacturing systems can utilize one or more filaments (or other feedstock) of desired material(s) that are converted to a flowable state and extruded for deposition to build a given 3D part utilizing extrusion paths in layers, 3D extrusions paths and/or combinations thereof. A typical material of the filament is a thermoplastic, polymer or copolymer material. When used in additive manufacturing systems, the thermoplastic, polymer or copolymer material can be part material or support material.

In the present disclosure, an exemplary material of construction for the part includes one or more semi-crystalline polymeric materials. The part material can include one or more amorphous polymers that are substantially miscible with the one or more semi-crystalline materials. Exemplary semi-crystalline polymer materials include those disclosed in U.S. Pat. Nos. 9,527,242, 9,925,714 and 10,023,739 and U.S. Published Patent Applications 2016/0375636, 2017/0183497 and 2018/0044523, all of which are incorporated by reference in their entireties.

The build material can compositionally include a polymer or polymeric matrix comprised of one or more polyaryletherketone (PAEK) materials, such as one or more polyetherketones (PEK), polyetheretherketones (PEEK), polyetherketoneketones (PEKK), polyetheretherketoneketones (PEEKK), polyetherketoneether-ketoneketones (PEKEKK), and mixtures thereof ("PAEK family"). In an exemplary embodiment, the build material includes a polymeric matrix of a semi-crystalline polyetherketoneketone (PEKK) and a secondary material or materials that accelerates crystallization of the PEKK, such as is disclosed in US. Published Patent Application 2018/0044523. The secondary material or materials are combined with the PEKK to form a blend wherein the PEKK is a largest component of the blend, wherein the blend is configured as a filament to be utilized in an additive manufacturing system. An exemplary secondary material includes a polyetheretherketone (PEEK).

In one embodiment disclosed in US. Published Patent Application 2018/0044523 XXXX, the semi-crystalline PEKK is between about 50 wt % and about 99 wt % of the polymeric matrix where the remainder of the polymeric matrix is PEEK. In another embodiment the semi-crystalline PEKK is between about 90 wt % and about 99 wt % of the polymeric matrix where the remainder is PEEK. In another embodiment, the semi-crystalline PEKK is about 95 wt % of the polymeric matrix and the PEEK is about 5 wt % of the polymeric matrix.

In some embodiments, fillers are added to the material where the fillers are in the range of about 1 wt % and about 90% of the total weight of the material. Exemplary fillers include glass fibers, carbon fibers, particles, or combinations thereof.

In some embodiments, additives such as antioxidants and/or processing aids (e.g., lubricants) are added to the blend. The additives may range from of 0.1 wt % to about 10 wt % of the total weight of the material.

While an exemplary part material is a PAEK family polymer or polymeric matrix material, and a specific exemplary embodiment is a semi-crystalline PEKK and PEEK, the present disclosure can be utilized with any semi-crystalline polymeric material, including but not limited to semi-crystalline polycarbonate, semi-crystalline polylactic acid, and polyamides such as nylon 6,6. However, the listed semi-crystalline materials described are non-limiting examples.

As discussed above the material is in a filament form that is suitable for use in an extrusion-based additive manufacturing system. In one embodiment, the extrusion-based additive manufacturing system can form the 3D parts in a layer-by-layer manner where the layers are in a plane. In another embodiment, the 3D parts are printed utilizing three-dimensional tool paths, two-dimensional tool paths or combinations of three-dimensional tool paths and two-dimensional tool paths.

FIG. 1 is a schematic front view of an exemplary additive manufacturing system 10. As shown in FIG. 1, system 10 is an extrusion-based additive manufacturing system for printing or otherwise building 3D parts and support structures using a layer-based, additive manufacturing technique, where the 3D part can be printed from part material and support structures can be printed from support material. Suitable extrusion-based additive manufacturing systems for system 10 include fused deposition modeling systems developed by Stratasys, Inc., Eden Prairie, Minn. under the trademark "FDM".

In the illustrated embodiment, system 10 includes chamber 12, platen 14, platen gantry 16, print head 18, head gantry 20, and consumable assemblies 22 and 24. Chamber 12 is an enclosed environment that contains platen 14 and any printed objects. Chamber 12 can be heated (e.g., with circulating heated air) to reduce the rate at which the part and support materials solidify after being extruded and deposited. In alternative embodiments, chamber 12 can be omitted and/or replaced with different types of build environments. For example, parts can be built in a build environment that is open to ambient conditions or may be enclosed with alternative structures (e.g., flexible curtains).

Platen 14 is a platform on which printed parts and support structures are printed in a layer-by-layer manner. In some embodiments, platen 14 may also include a flexible polymeric film or liner on which the printed parts and support structures are printed. In the illustrated example, print head 18 is a dual-tip extrusion head configured to receive consumable filaments from consumable assemblies 22 and 24 (e.g., via feed tube assemblies 26 and 28) for printing 3D part 30 and support structure 32 on platen 14. Consumable assembly 22 may contain a supply of a part material, such as a high-performance semi-crystalline material, for printing printed part 30 from the part material. Consumable assembly 24 may contain a supply of a support material for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12. In an alternative embodiment, platen 14 may be configured to move in the horizontal x-y plane within chamber 12 and print head 18 may be configured to move along the z-axis. Other similar arrangements may also be used such that one or both of platen 14 and print head 18 are moveable relative to each other over a desired number of degrees of freedom. Platen 14 and print head 18 may also be oriented along different axes. For example, platen 14 may be oriented vertically and print head 18 may print printed part 30 and support structure 32 along the x-axis or the y-axis.

The print head 18 can have any suitable configuration. Examples of suitable devices for print head 18 include those disclosed in Crump et al., U.S. Pat. No. 5,503,785; LaBossiere, et al., U.S. Pat. Nos. 7,384,255 and 7,604,470; Leavitt, U.S. Pat. No. 7,625,200; Comb et al., U.S. Pat. No. 8,153,182; Swanson et al., U.S. Pat. Nos. 8,419,996 and 8,647,102; and Batchelder U.S. Pat. No. 8,926,882 and Barclay et al. U.S. Published Patent Application 2018/0043627.

System 10 also includes controller 34, which can include one or more control circuits configured to monitor and operate the components of system 10. For example, one or more of the control functions performed by controller 34 can be implemented in hardware, software, firmware, and the like, or a combination thereof. Controller 34 can communicate over communication line 36 with chamber 12 (e.g., with a heating unit for chamber 12), print head 18, and various sensors, calibration devices, display devices, and/or user input devices.

System 12 and/or controller 34 can also communicate with computer 38, which can include one or more discrete computer-based systems that communicate with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

A digital model representative of a 3D part to be printed can be created, such as by scanning an existing object to create a digital image filet, or such as by creating a model using a computer-aided design (CAD) program. The digital model and/or instructions for printing the model can be loaded into computer 38. The computer 38 can communicate with controller 34, which serves to direct the system 10 to print the 3D part 30 and optionally, a support structure 32. Part and material is deposited in layers along toolpaths that build upon one another to form the 3D part 30.

Figure 2:
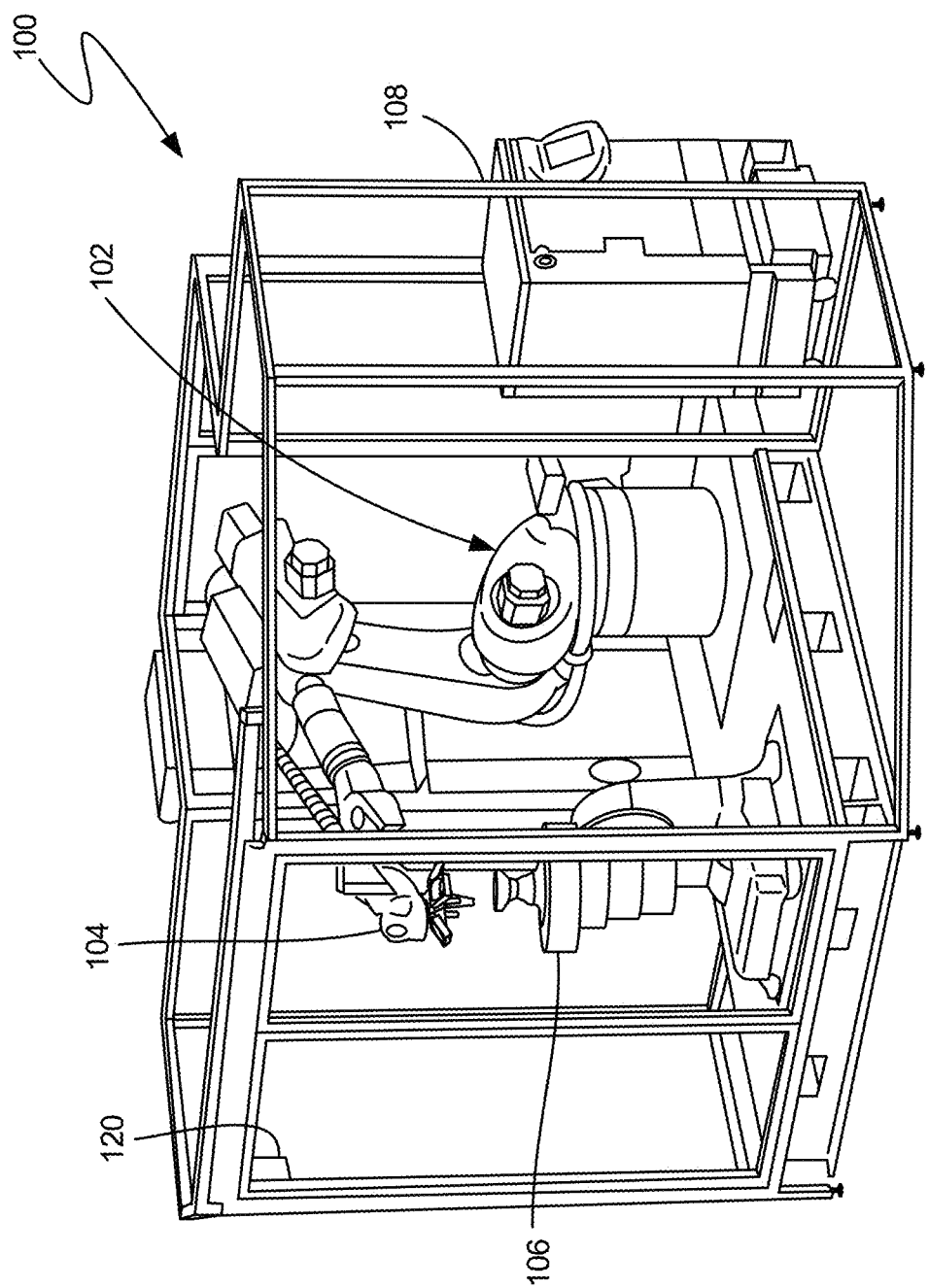
FIG. 2 is a perspective view another exemplary extrusion based additive manufacturing system.

FIG. 2 is a perspective view of a multi-axis robotic build system 100 that may be used for building three-dimensional (3D) parts utilizing two-dimensional tool paths, three-dimensional tool paths and combinations thereof. System 100 includes in one embodiment a robotic arm 102 capable of movement along six axes. An exemplary robotic arm is an industrial robot manufactured by KUKA Robotics of Augsburg, Germany. While six axes of motion are discussed for the robotic arm 102 from a stationary base, it should be understood that additional axes or other movements are also amenable to use with the embodiments of the present disclosure, without departing therefrom. For example, the robotic arm 102 could be mounted to move on a rail or a gantry to provide additional degrees of freedom.

The robotic arm 102 carries a print head 104, such as an extrusion head 104 for printing parts from a filament feedstock. In some instances, the feedstock is a polymer or copolymer which optionally can be loaded or filled with secondary materials such as glass or carbon fiber, and impact modifiers.

A build platform 106 is provided, which in one embodiment is movable along two axes of rotation, rotation about the z-axis, and tilting (rotation) about the x-axis.

A controller 108 contains software and hardware for controlling the motion of the robotic arm 102 and the build platform 106, as well as the printing operation of the print head 104.

A generated tool path is utilized to control motion of the robotic arm 102. However, control of the extrusion head is also used to accurately deposit material along the generated tool path. For example, one embodiment of the present disclosure synchronizes timing of the motion of the robotic arm 102 with print head 104 to extrusion from the print head 104. Embodiments of the present disclosure provide for speed up or slowdown of printing, changing the extrusion rate in conjunction with robotic movements, tip cleaning, tip changing, and other actions of the print head 104 based on the generated tool path and motion of the robotic arm 102. As an example, extrusion from the print head 104 may be synchronized with motion of the robotic arm 102 in manners taught by Comb et al. U.S. Pat. No. 6,054,077; and Comb U.S. Pat. Nos. 6,547,995, and 6,814,907.

A print head used with a fused deposition additive manufacturing system such as the embodiment of system 10 or 100 typically utilizes a liquefier comprising a cylindrical liquefier tube and a nozzle having an extrusion tip, such as is disclosed in Swanson et al. U.S. Pat. No. 6,004,124. A heater such as a heating block or a heating coil is positioned about the liquefier tube along a length extending from proximate the outlet end to a location below the inlet end. The heater creates a melt zone region within a lower longitudinal region of the liquefier where the filament feedstock to heated and melted to form a melt pool. The melt pool forms a meniscus around the unmelted portion of the filament (i.e., the start of a transition zone), such as is described and shown in Swanson U.S. Pat. No. 8,815,141. As filament feedstock is driven into the inlet end of the liquefier, molten material from the melt pool is extruded through the extrusion tip at the outlet end. It is understood that when extrusion rates are increased or are high extrusion rates are utilized, the meniscus will tend to drop to a lower position in the liquefier. Conversely, when extrusion rates are decreased or low extrusion rates are utilized, the meniscus will generally rise to a higher region in the liquefier.

In some instances, a region at or near the inlet end of the liquefier tube is actively cooled to prevent overheating of the filament as it enters the liquefier. Active cooling maintains the filament at a sufficiently low temperature that it does not become limp and buckle before it enters the melt zone. In addition, cooling in the region of the liquefier inlet prevents overheating of the filament drive, electrical supply, and other components of the extruder or print head. As such, a substantially large temperature gradient is created from the inlet end to the location of an upper end of the heater, where amount of cooling of the liquefier tube increases as the distance from the heater increases.

When printing 3D parts with amorphous polymeric materials, once a temperature of the material is raised above a glass transition temperature, the material becomes flowable. As the temperature is raised above the glass transition temperature, the viscosity of the flowable material abruptly decrease to an extrudable range. Due to the highly predictable and desirable melt properties of amorphous materials, the melt behavior of these materials is remains predictable and controllable as the filament feedstock moves through the temperature gradient that is created by the cooled inlet zone followed by the heated melt zone and melt pool at both low flow rates and high flow rates.

In contrast to amorphous polymeric materials that become flowable after exceeding a glass transition temperature, semi-crystalline materials remain, at least partially, in solid form until the material reaches a typically higher melting temperature. Once the semi-crystalline material reaches the melting temperature, a melt pool is formed within the liquefier tube. However, for semi-crystalline materials, the melt pool does not always completely melt away; as the temperature of the melted semi-crystalline material is reduced to a hot crystallization temperature, crystalline structures begin to re-form and build up in the amorphous/semi-crystalline mixture of resin.

When printing 3D parts with semi-crystalline materials at higher extrusion rates, the meniscus and the transition zone are sufficiently low in a liquefier tube with a substantially constant cross-sectional area, such that the melted material is retained above the hot crystallization temperature. However, when extruding semi-crystalline materials at lower flow rates, the meniscus and transition zone are raised in the liquefier tube. Due to the temperature gradient within the liquefier tube, the melted materials may begin to cool below the hot crystallization temperature. When the melted semi-crystalline material cools to the hot crystallization or below, crystalline structures begin to re-form in the melt pool, creating higher viscosity and a generally more abrasive and cloggable resin mixture.

Due to the minimal gap between an outer surface of the filament and the inner surface of the liquefier tube, the crystalline structures floating within the semi-crystalline melt result in an increase in viscosity and require increased shear force at the meniscus and melt transition zone, as the filament is driven through it, at lower extrusion rates. The increased shear forces can hinder the filament from being easily driven into the melt pool, resulting in significantly increased motor amperage requirements, extrusion flow variations, and ultimately, will result in toolpath errors during printing of the 3D parts. By way of non-limiting example, a typical nominal gap between the outer surface of the filament ranges from 0.001 inches and about 0.005 inches and more typically a nominal gap of between 0.0015 and about 0.0025 inches.

An exemplary PAEK family feedstock that experiences difficulties in extruding at lower extrusion rates is a blend of semi-crystalline PEKK and a secondary material, such as PEEK, wherein the PEKK is the majority of the polymeric blend.

When the semi-crystalline material is extruded at low flow rates in a typical liquefier tube, the low flow rate causes the meniscus and transition zone to rise, which causes a temperature drop in the melt pool such that crystalline structures form and the viscosity of the melted material increases. The formation of crystalline structures and the increase in viscosity causes shear forces to increase between the outer surface of the filament and the inner surface of the liquefier tube. Motors used to drive the filament into the liquefier tube may not be able to provide sufficient power, or push force, to overcome the shear forces at the meniscus and in the transition zone. When electric motors reach their maximum amperage, the motors will pause, resulting in printing errors.

One option is to increase the size of the drive motor. However, increasing the size of the motor will increase the cost of the additive manufacturing system and/or print head and will also increase the weight of the equipment that is carried by a gantry in system 10 or the robotic arm in system 100, which can cause errors, especially when accelerating or decelerating the print head.

The present disclosure is directed to a configuration of a liquefier tube that allows semi-crystalline materials to be printed at lower flow rates, utilizing the same motor as amorphous materials, by decreasing shear forces proximate the meniscus and within the transition zone when forcing a filament into a viscous melt pool within a liquefier tube. The liquefier tube has a larger diameter in an upper portion of its melt zone and a smaller diameter in a lower portion of its melt zone. The larger diameter allows for the meniscus to be lower in the liquefier tube (further downstream) while the smaller diameter near the exit of the liquefier allows for accurate extrusion flow control. If a generally larger and consistent diameter were used in the melt zone, flow control at the extrusion tip would be poorer in quality.

Maintaining the meniscus lower in the liquefier tube and closer to the heating element during lower extrusion rates, maintains the meniscus and the transition zone at a temperature above the hot crystallization temperature. As such, the formation of crystalline structures is minimized and/or eliminated. Further, the hotter temperature decreases viscosity, both from the perspective of runnier resin, but also from the standpoint of suspended crystals in melted resin. Additionally, the increase in the diameter increases the gap between the outer surface of the filament and the inner surface of the liquefier tube, which decreases sheer forces relative to the liquefier tube with a smaller diameter. By maintaining a higher temperature at the meniscus and the transition zone, the force required to force the filament into the melt pool is decreased, the viscosity is lowered, and the formation of crystalline structures is minimized or eliminated.

The present disclosure allows for accurate extrusion within a complete range of extrusion rates, including relatively low extrusion rates. Because shear forces between the filament and the inner surface of the liquefier tube are reduced, the same motor can be utilized for a variety of filament materials, consisting of both amorphous and semi-crystalline polymeric material compositions.

Figure 3:
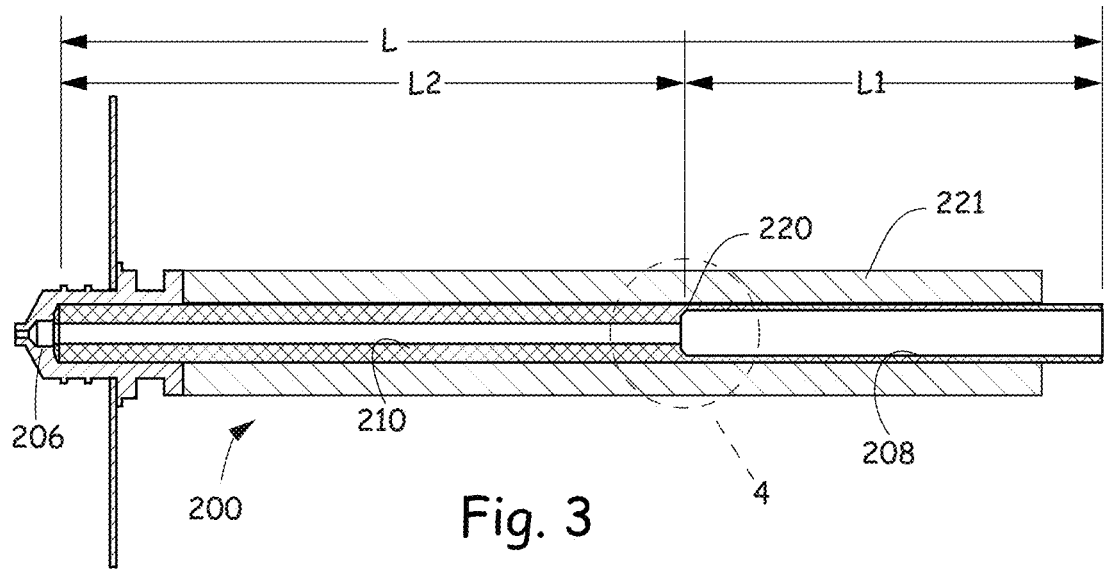
FIG. 3 is a cross-sectional view of a liquefier tube of the present disclosure.
Figure 4:
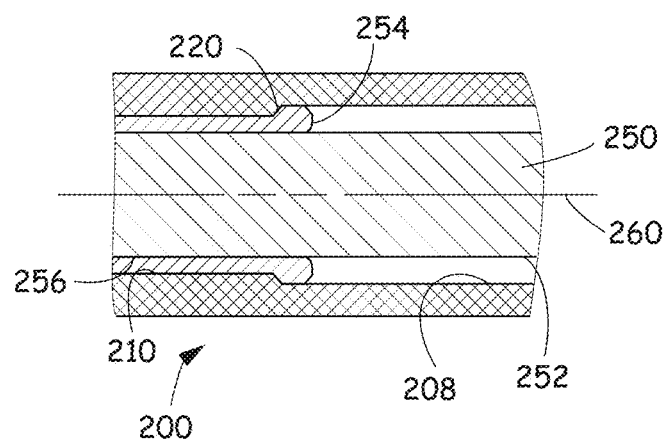
FIG. 4 is a cross-sectional view of the liquefier tube with a filament and melt pool.
Figure 5:
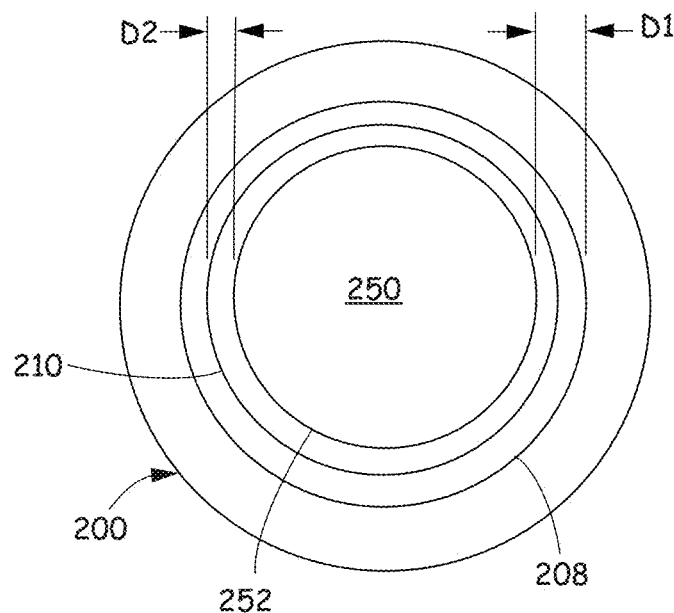
FIG. 5 is a top view of the liquefier tube with the filament.

Referring to FIGS. 3-5 where the cross-sectional dimensions are exaggerated for purposes of illustration, a cross-section of liquefier tube 200 is illustrated where shear forces between the filament and the inner surface 202 of the liquefier tube 200 are decreased. The liquefier tube 200 is counter-bored a selected distance L1 from an inlet end 204 into the liquefier tube. A typical selected distance L1 of the counter-bore ranges from about one tenth to about one half of the distance L between the inlet end 204 and an outlet end 206 of the liquefier tube 200. An exemplary distance L1 of the counter-bore is about one third of the distance L between the inlet end 204 and the outlet end 206.

The counter-bored inner surface 208 along the length L1 increases a nominal distance between an outer surface 252 of a filament 250 and an inner surface 208 of the liquefier tube 200 by a factor of about 1.5 and about 2.5 relative to a nominal distance between an inner surface 210 of the liquefier tube 200 along the length L2 and the outer surface 252 of the filament 250.

The counter-bored inner surface 208 along the length L1 creates a shoulder 230 and increases a nominal distance D1 between the outer surface 252 of the filament 250 and the inner surface 208 of the liquefier tube 200 by a factor of about 1.8 and about 2.2 relative to a nominal distance D2 between the inner surface 210 along the length L2 and the outer surface 252 of the filament 250. In an exemplary embodiment, the counter-bored inner surface 208 along the length L1 increases the nominal distance D1 between the outer surface 252 of the filament 250 and the inner surface 208 of the liquefier tube 200 by a factor of about 2.0 relative to the nominal distance D2 between the inner surface 210 along the length L2 and the outer surface 252 of the filament 250.

While not being bound by theory, it is believed that utilizing a counter-bored region along the length L1 of the liquefier tube 200, relative to the region along the length L2, controls the location of a meniscus 254 of a melt pool 256 to be lower within a melt region in the liquefier tube 200 relative to a liquefier tube of similar dimensions that does not have a counter-bored region. Controlling the location of the meniscus 254 lower in the liquefier tube while above the shoulder 220 retains the meniscus proximate a heating element 221, which prevents the formation of crystalline structures, reduces viscosity and increases the area in which the melt pool 256 can re-circulate, all of which decrease shear forces at the meniscus and within the transition zone. Therefore, the present disclosure allows the same filament drive motor to be utilized with materials that having different viscosities.

In the illustrated embodiment, the shoulder 220 is downwardly sloped at an angle of about 45°. A typical range of the downwardly sloping surface of the shoulder 220 range from about 10° to about 60°. However, the shoulder 220 can have any angle that prevents the buildup of crystalline materials thereon.

In a non-limiting, exemplary embodiment, the nominal distance D2 between the surface 252 of the filament 250 and the inner surface 210 along the length L2 is about 0.001 inches. The nominal distance D1 between the surface 252 of the filament 250 and the inner surface 208 along the length L1 is about 0.002 inches, where L1 is about one third of the length L of the liquefier tube 200. However, while the nominal distance D2 is double that of the nominal gap D1, the change in annular area between the surface 252 of the filament 250 and the inner surface 202 is more than doubled because the area of the annular gap between the surface 252 of the filament 250 and the inner surfaces 208 and 210 is based upon the square of the radius from central axis 260 to the inner surfaces 208 and 210. By way of non-limiting example, a liquefier with a 0.074 inch bore is counterbored in L1 to diameter of 0.079 inches. Utilizing the above configuration of the inner surface 202 of the liquefier tube 200 allows for volumetric seam control that has otherwise been compromised when larger radial gaps are realized between the surface 252 of the filament 250 and the inner surface 210 of the liquefier tube 200. While exemplary dimensions are disclosed, it is understood that these dimensions are non-limiting and that the disclosure applies to any extrusion based additive manufacturing system utilizing any suitable dimensions including non-circular cross-sectional channels within the liquefier tube.

Figure 6:
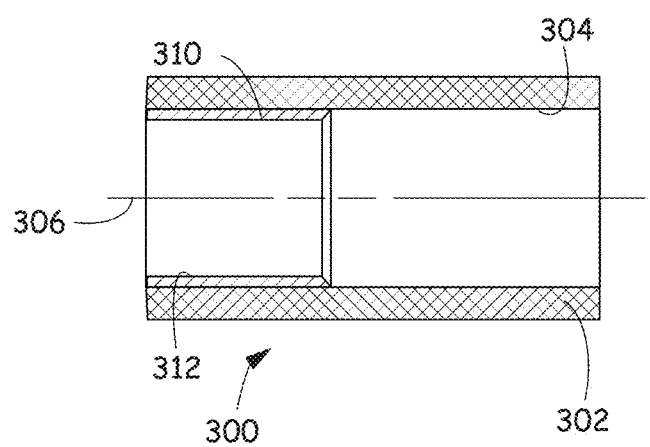
FIG. 6 is cross-sectional view of another stepped down liquefier tube with an insert positioned proximate an outlet end.

As illustrated in FIGS. 3-5, the liquefier tube is of a unitary or monolithic construction where the upper portion is counterbored a length L1 while inner surface of the remaining length L2 is unmodified. Referring to FIG. 6, another embodiment of a liquefier tube is illustrated at 300. The liquefier 300 has a tube 302 extending along a length extending from an inlet end to an outlet end and has an inner surface 304 having a substantially constant radius or cross section taken in a plane substantially normal to an axis 306.

The liquefier 300 includes an insert 310 that extends into the liquefier tube 302 from the outlet end where the insert 310 has a length similar to that of L2 in the embodiment 200 when a bottom end of the insert is aligned with the outlet end of the tube. An outer surface 312 of the insert 310 contacts the inner surface 304 of the liquefier tube 320 such that heat conducts from the liquefier tube 302 to the insert 310 to supply sufficient heat flux to melt the filament and provide a selected flow rate. The spacer 310 may be the same material as that of the tube 302, which is typically a stainless steel. However, the spacer 310 may be a different material than that of the liquefier tube 302 where the spacer 310 can be constructed of material having a higher thermal conductivity than that of the liquefier tube 302 such that the spacer 310 evenly distributes the heat into the filament. An exemplary material of construction of the spacer 310 is copper.

The present disclosure balances the need to maintain the meniscus and the transition zone lower in the liquefier tube by having the counterbored length L1 while allowing the for accurate extrusion by having a smaller diameter portion along the length L2. If the length L2 were reduced more than disclosed or eliminated, the extrusion rate would become inaccurate. If the length L1 were reduced more than disclosed or eliminated, then printing errors would occur at lower flow rates, as discussed above. The disclosed ratios of L1 to L2 balances the ability to be able to extrude semi-crystalline materials at lower flow rates with extrusion accuracy across the range of flow rates.

EXAMPLES

The present disclosure is more particularly described in the following examples that are intended as illustrations only, since numerous modifications and variations within the scope of the present disclosure will be apparent to those skilled in the art.

Example 1

A filament material having a nominal diameter of 0.0707 in. and containing about 95 wt % semi-crystalline PEKK and about 5 wt % PEEK was melted and extruded in a Stratasys® FORTUS® 450mc additive manufacturing system at various flow rates ranging from about 250 mics to about 2,500 mics utilizing a standard T20C liquefier tube. The standard T20C liquefier tube has an inner diameter of 0.074 in. and a length of 3.6 in. wherein the inner diameter is substantially the same along the length of the liquefier tube. The FORTUS 450mc additive manufacturing system and the T20C tip are manufactured by Stratasys, Inc. located in Eden Prairie, Minn.

Figure 7:
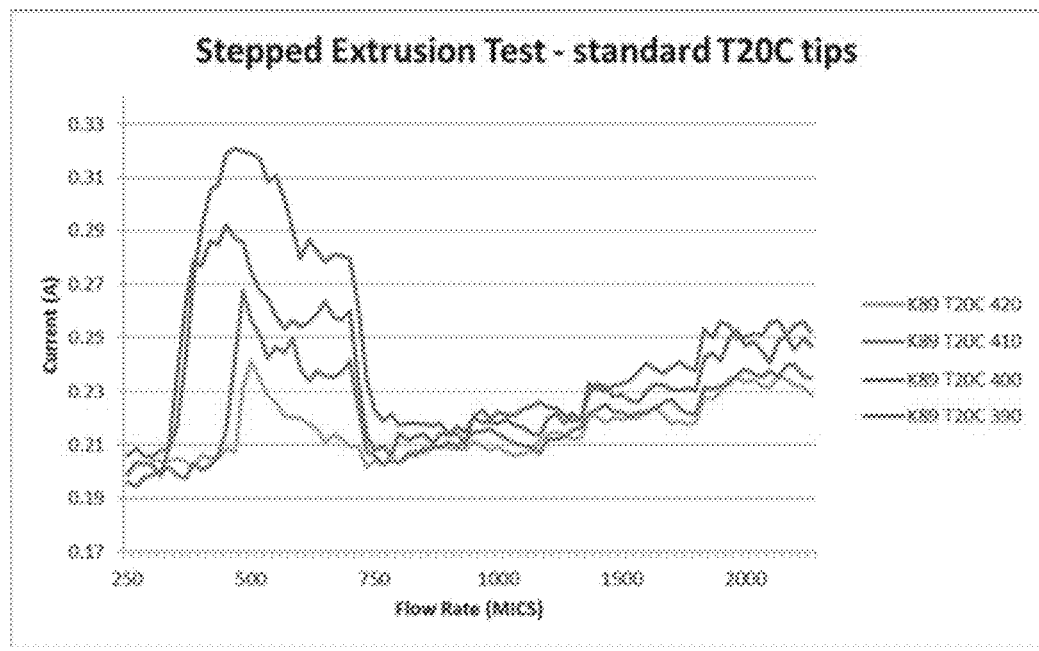
FIG. 7 is a graph of amperage utilized by a drive motor versus flow rate utilizing a standard liquefier tube.

The extrusion flow rate was stepped upwardly from about 250 mics to about 2,500 mics and the current of the filament drive motor was measured as the flow rate was stepped upwardly. A graph of current drawn by the filament drive motor as the flow rate is increased is illustrated in FIG. 7. FIG. 7 illustrates that at flow rates less than about 750 mics, requires higher amperages which is indicative of high shear forces. The legend for the different stepped extrusion tests illustrated indicate that the serial number for the Fortus 450mc (K89), the extrusion tip (T20C) and the temperature setpoint in degrees Celsius (390, 400, 410 and 420).

One skilled will understand that the flow rate data is for a Fortus 450mc fused deposition modeling printer. Additive manufacturing systems with different flow rate capabilities will have a different range of what is considered to be low flow rates. However, when extruding semi-crystalline polyaryletherketone materials in additive manufacturing systems, a high shear force will be encountered with a standard liquefier tube.

Example 2

The same filament material was utilized in the same Stratasys® FORTUS® 450mc additive manufacturing system. However, an upper portion of the liquefier tube was counterbored a selected distance from an inlet end. The upper portion was counterbored to 0.079 inches at depths of 1.2 inches, 0.75 inches and 0.5 inches. The legend for the different stepped extrusion tests illustrated indicate that the serial number for the Fortus 450mc (K89, K77, K32), the extrusion tip (T20C), the counterbore depth (1.2, 0.75 and 0.5 inches) and the temperature setpoint in degrees Celsius (390, 400 and 410).

Figure 8:
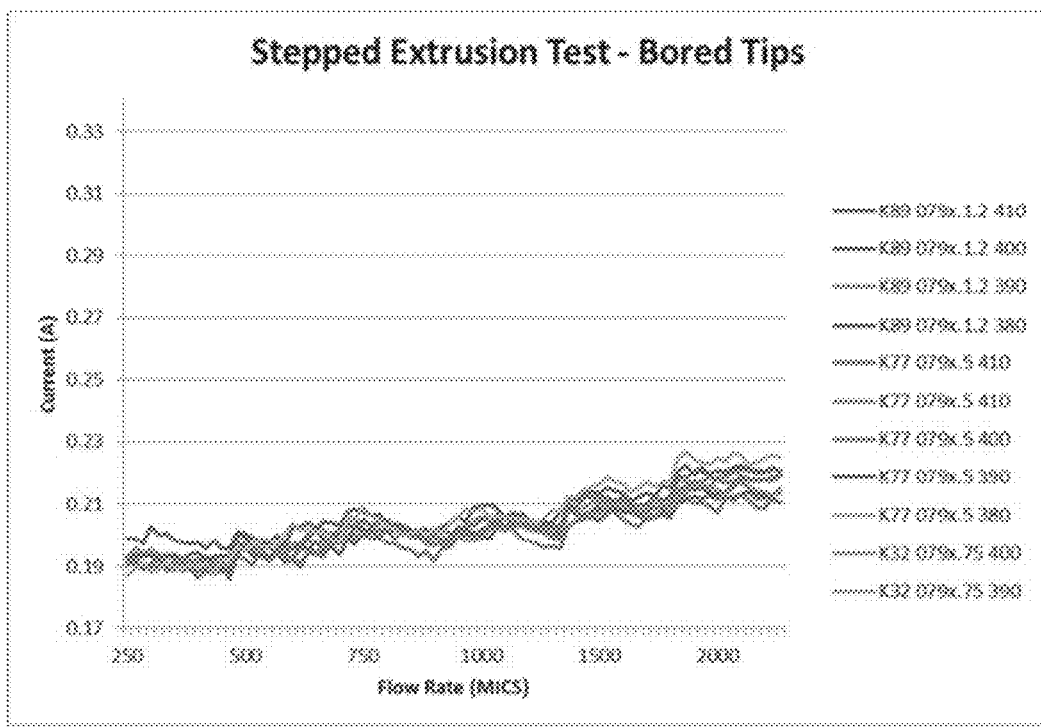
FIG. 8 is a graph of amperage utilized by a drive motor versus flow rate utilizing the liquefier tube of the present disclosure.

The same test as described in Example 1 was conducted with the counterbored liquefier tubes and graphically illustrated in FIG. 8. FIG. 8 illustrates that the amperage increase was substantially proportional to the increase in flow rate. In particular, the modified liquefier tube decreased shear forces at rates below 750 mics relative to the shear forces of a standard liquefier tube, when extruding semi-crystalline polyaryletherketone materials in additive manufacturing systems.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of 3D printing a part with an extrusion-based additive manufacturing system, the method comprising:
providing a filament having a semi-crystalline material as a majority component of a polymeric matrix into a liquefier, the liquefier comprising a liquefier tube having an inlet end and a heated outlet end and an extrusion tip at the outlet end, the liquefier tube having an overall length between the inlet end and the outlet end, wherein an upper portion of the liquefier tube adjacent the inlet end has a first length and a first cross-sectional area substantially perpendicular to a longitudinal axis, a lower portion of the liquefier tube adjacent the outlet end has a second length and a second cross-sectional area substantially perpendicular to the longitudinal axis, wherein the first cross-sectional area is greater than the second cross-sectional area such that a first nominal distance from the outer surface of the filament to a first surface of the upper portion measured substantially perpendicular to the longitudinal axis is about 1.5 to about 2.5 times greater than a second nominal distance from the outer surface of the filament to a second surface of the lower portion measured substantially perpendicular to the longitudinal axis, and wherein the extrusion tip includes an extrusion port having a third cross-sectional area that that is less than the second cross-sectional area and the extrusion tip includes a downwardly slope surfaces that slopes downwardly to the extrusion port, and wherein a shoulder includes a downwardly sloping surface in a range from about 10° to about 60°, and a heating element positioned about the liquefier tube from proximate the heated outlet end to a location above the shoulder wherein the shoulder transitions the first cross-sectional area and the second cross-sectional area is located in a melt zone of the liquefier, wherein the melt zone extends substantially along a length of the heating element;
advancing the filament into the melt zone the liquefier at a selected rate based upon a desired extrusion rate;
melting the filament within the melt zone by imparting heat into the filament with the heating element to form a melt pool capped by a meniscus located above the shoulder during at least a portion of the printing of the part; and
printing the part in a series of layers by extruding the melted filament having a majority of semi-crystalline material from the melt pool through the extrusion tip along tool paths representative of the part by driving the unmelted filament into the melt pool at the selected rate to force the melted material through the extrusion port along the tool paths, wherein utilizing the liquefier tube with the upper portion above the lower portion causes the meniscus to be lower relative to a liquefier having a constant diameter such that shear forces are decreased proximate the meniscus allows the series of layers to be more accurately printed at varying flow rates relative to the liquefier having the constant diameter.

2. The method of claim 1 and wherein the polymeric matrix comprises semi-crystalline PEKK.

3. The method of claim 1 and wherein the polymeric matrix comprises semi-crystalline PEKK in the range of about 90 wt % and about 99 wt % of a polymeric blend where the remainder of the polymeric blend is PEEK.

4. The method of claim 1 and wherein the polymeric matrix comprises about 95 wt % semi-crystalline PEKK of a polymeric blend and about 5 wt % PEEK of the polymeric blend.

5. The method of claim 1 and wherein the first length is about one tenth to about one half of the overall length.

6. The method of claim 1 and wherein the first length is about one third of the overall length.

7. The method of claim 1 and wherein a first nominal distance from the outer surface of the filament to a first surface of the upper portion measured substantially perpendicular to the longitudinal axis is about 2.0 times greater than a second nominal distance from the outer surface of the filament to a second surface of the lower portion measured substantially perpendicular to the longitudinal axis.

8. The method of claim 1 wherein the shoulder is downwardly sloped between the upper portion and the lower portion to prevent the build-up of crystalline material within the liquefier tube.

9. The method of claim 8, wherein the shoulder is downwardly sloped at an angle of about 45°.

10. The method of claim 1 and wherein the liquefier tube is of a monolithic construction.

11. The method of claim 1 wherein an insert defines the second length.

12. The method of claim 1 and further comprising actively cooling a region of the liquefier tube proximate the inlet end to maintain sufficient rigidity of the unmelted filament to provide the necessary force to cause melted material to be extruded through the extrusion port.

13. A method of reducing shear forces when 3D printing a part with an extrusion based additive manufacturing system, the method comprising:
providing a filament to a liquefier tube, wherein the filament has an outer surface and wherein the filament comprises a polymeric matrix having a semi-crystalline material as a majority component;
advancing the filament into a melt zone within a liquefier tube having an overall length between an inlet end and an outlet end, wherein an upper portion of the liquefier tube has a first length and a first cross-sectional area substantially perpendicular to a longitudinal axis and a lower portion of the liquefier tube has a second length and a second cross-sectional area substantially perpendicular to the longitudinal axis, wherein the first cross-sectional area is greater than the second cross-sectional area such that a first nominal distance from the outer surface of the filament to a first surface of the upper portion measured substantially perpendicular to the longitudinal axis is about 1.5 to about 2.5 times greater than a second nominal distance from the outer surface of the filament to a second surface of the lower portion measured substantially perpendicular to the longitudinal axis, and wherein a shoulder includes a downwardly sloping surface in a range from about 10° to about 60°, and wherein the extrusion tip includes an extrusion port having a third cross-sectional area that that is less than the second cross-sectional area and the extrusion tip includes a downwardly slope surfaces that slopes downwardly to the extrusion port, and a heating element positioned about the liquefier tube from proximate the heated outlet end to a location above the shoulder wherein the shoulder transitions the first cross-sectional area and the second cross-sectional area is located in a melt zone of the liquefier, wherein the melt zone extends substantially along a length of the heating element;

melting the filament with heat imparted by the heating element and within the melt zone of the liquefier tube to form a melt pool capped by a meniscus;

continuing to advance the filament into the melt zone the liquefier at a selected rate based upon a desired extrusion rate to provide a selected flow rate such that at lower feed rates, a larger surface area in the upper portion relative to the lower portion increases recirculation at the meniscus and within a transition zone and reduces shear forces between the outer surface of the filament and inner surfaces of the liquefier tube; and printing the part in a series of layers by extruding the feedstock having a majority of semi-crystalline material based along tool paths representative of the part by driving the unmelted filament into the melt pool at the selected rate to force the melted material through the extrusion port along the tool paths, wherein utilizing the liquefier tube with the upper portion above the lower portion causes the meniscus to be lower in the melt zone relative to a liquefier having a constant diameter such the reformation of crystalline structures in the melt pool is reduced and a viscosity of the melt pool proximate the meniscus is lowered such that the shear forces are decreased proximate the meniscus allows the series of layers to be more accurately printed at varying flow rates relative to the liquefier having the constant diameter.

14. The method of claim 13 and wherein the polymeric matrix comprises semi-crystalline PEKK.

15. The method of claim 13 and wherein the polymeric matrix comprises semi-crystalline PEKK in the range of about 90 wt % and about 99 wt % of a polymeric blend where the remainder of the polymeric blend is PEEK.

16. The method of claim 13 and wherein the polymeric matrix comprises about 95 wt % semi-crystalline PEKK of a polymeric blend and about 5 wt % PEEK of the polymeric blend.

17. The method of claim 13 and wherein the first length is about one tenth to about one half of the overall length.

18. The method of claim 13 and wherein the first length is about one third of the overall length.

19. The method of claim 13 and wherein a first nominal distance from the outer surface of the filament to a first surface of the upper portion measured substantially perpendicular to the longitudinal axis is about 1.8 to about 2.2 times greater than a second nominal distance from the outer surface of the filament to a second surface of the lower portion measured substantially perpendicular to the longitudinal axis.

20. The method of claim 13 and wherein a first nominal distance from the outer surface of the filament to a first surface of the upper portion measured substantially perpendicular to the longitudinal axis is about 2.0 times greater than a second nominal distance from the outer surface of the filament to a second surface of the lower portion measured substantially perpendicular to the longitudinal axis.

21. The method of claim 13 wherein the shoulder is sloped downward between the upper portion and the lower portion to prevent a build-up of crystalline material within the liquefier tube.

22. The method of claim 13 and wherein the liquefier tube is of a monolithic construction.

23. The method of claim 13 and wherein a copper insert in the lower portion of the liquefier tube defines the second length.

24. The method of claim 13 and further comprising actively cooling a region of the liquefier tube proximate the inlet end to maintain sufficient rigidity of the unmelted filament to provide the necessary force to cause melted material to be extruded through the extrusion port.

\* \* \* \* \*